United States Patent [19]

Decker

[11] Patent Number: 4,778,083

[45] Date of Patent: Oct. 18, 1988

[54] MIXING AND DISPENSING APPARATUS

[76] Inventor: Herman W. Decker, P.O. Box 1106, Port Salerno, Fla. 34992

[21] Appl. No.: 83,659

[22] Filed: Aug. 10, 1987

[51] Int. Cl.[4] ............................ B67D 5/60; F16K 1/14
[52] U.S. Cl. .................................. 222/144.5; 222/145; 222/318; 222/389; 366/159; 137/635; 137/864; 137/865; 137/869; 239/414; 239/416.2
[58] Field of Search ................. 366/150, 159; 137/607, 137/635, 864–865, 869, 898; 239/412, 414, 416.2, 527; 222/129, 135, 144.5, 145, 318, 394, 148–149, 389

[56] References Cited

U.S. PATENT DOCUMENTS

| | | | |
|---|---|---|---|
| 3,503,420 | 3/1970 | Gurley | 137/865 |
| 3,746,048 | 7/1973 | Harper | 137/607 X |
| 4,155,508 | 5/1979 | Fiorentini | 239/414 X |
| 4,332,335 | 6/1982 | Fiorentini | 222/145 |
| 4,471,887 | 9/1984 | Decker | 222/135 |
| 4,600,312 | 7/1986 | Scrivo | 366/159 |

FOREIGN PATENT DOCUMENTS

729250 11/1942 Fed. Rep. of Germany ...... 239/414

Primary Examiner—Michael S. Huppert
Attorney, Agent, or Firm—Marshall & Melhorn

[57] ABSTRACT

An apparatus for mixing and dispensing fluid components includes a mixing chamber for mixing reactive components prior to dispensing the components. The components are provided through separate valves to ducts in fluid communication with inlets to the mixing chamber. The valve actuator can be selectively positioned to prevent one of the valve from opening. The valves are ball valves which are actuated by a hydraulic actuator acting through a rack and gear system. The rack is cylindrical with a flat spot formed thereon for preventing rotation of an associated one of the gears as the actuator is moved.

18 Claims, 5 Drawing Sheets

MIXING AND DISPENSING APPARATUS

BACKGROUND OF THE INVENTION

This invention generally relates to a device for mixing and dispensing a mixture of fluids and, more particularly, to a device for mixing two reactive fluids in a homogeneous reactive mixture and dispensing the mixture into an open mold.

Conventionally, fluids flowing under pressure are mixed in and ejected from devices such as dispensing guns. In such guns, the fluids are separately introduced into a mixing chamber, having an open outlet end, from spaced inlets opening into the chamber. A plunger, occupying the chamber, exposes the inlets in a rearward position and permits fluids to flow into the chamber, mix, and be ejected from the outlet end. Movement of the plunger toward its forward position closes the inlets and purges the chamber by expelling any residual material therein. The purpose of the plunger is to purge the chamber of any quantities of residual materials, as well as to open and close the inlets communicating with the chamber.

To date, manufacturers of dispensing guns have overlooked the crucial point of having the fluid system completely filled and under uniform fluid pressure before the inlets to the mixing chamber are opened. If the first fluid component arrives at its inlet prior to the other fluid component arriving at its inlet, the first fluid component fills the mixing chamber and crosses over to the other unfilled inlet. One attempt to overcome this problem has been to open valves at the inlets at the same instant the plunger occupying the chamber is retracted therefrom. Other attempts have been made to open valves at the inlets simultaneously, however the inlets may or may not have full fluid components present at the same instant. It has been found that if one or the other of the fluid component's pressure is lost during the standby, the unfilled inlet is again exposed to a possible crossover of fluid from the other inlet. Also, it has been found in practice that reactive fluids tend to seep around the plunger in the closed position, mix, and react to indeed subsequent operation of the dispensing gun.

In U.S. Pat. No. 4,471,887, there is disclosed a dispensing gun which is provided with spring-biased, normally closed check valves at each of the reactive fluid inlets to the mixing chamber. The check valves are opened by the pressure of the reactive fluid components. Each fluid passage supplying a reactive fluid component to the check valves is provided with an on-off valve adapted to be opened and closed in conjunction with the reciprocating movement of a plunger in the mixing chamber.

SUMMARY OF THE INVENTION

The present invention concerns a dispensing gun for mixing and dispensing two reactive fluids into an open mold. A pair of spherical valve members are interconnected to a valve actuating rack member. The rack member is adjustable to selectively actuate the associated spherical valve members such that both valves are positioned to admit a fluid from a respective source to a mixing chamber, or only a selected one of the valves admits the associated fluid to the mixing chamber.

BRIEF DESCRIPTION OF THE DRAWINGS

The above, as well as other objects of the invention, will become readily apparent to one skilled in the art from reading the following detailed description of the preferred embodiment of the invention when considered in light of the accompanying drawings in which.

DETAILED DESCRIPTION OF THE PREFERRED EMBODIMENT

Figure 1:
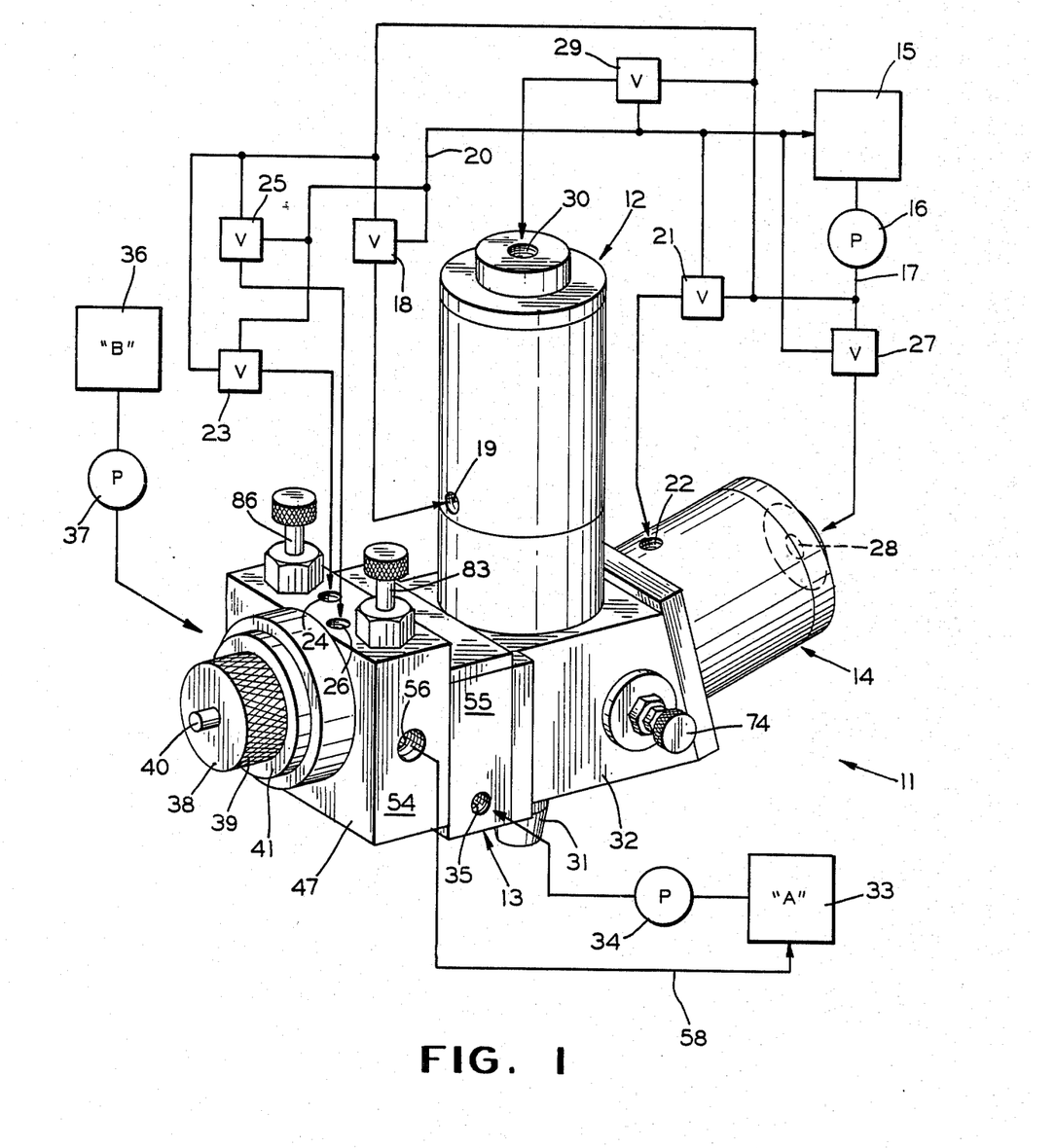
FIG. 1 is a perspective view of a dispensing device constructed in accordance with the present invention together with a liquid supply circuit shown in schematic form.

A mixing and dispensing apparatus 11 in accordance with the present invention is shown in FIG. 1 The apparatus 11 includes a main body 12 which houses a double acting piston, as shown in subsequent drawings, and has attached thereto a valve block 13 and a mixing block 14. A source of hydraulic fluid 15, such as a reservoir, is connected to a pump 16 which pressures the hydraulic fluid for use in actuating various valves in the mixing and dispensing apparatus 11. The output side of the pump 16 is connected to an output line 17 which in turn is connected to various ports formed in the mixing and dispensing apparatus 11. For example, the output line 17 is connected through a valve 18 to a discharge duct cylinder port 19 formed in a side of the main body 12 to which the valve block 13 is attached. In one position, the valve 18 permits the pressured fluid from the line 17 to flow into the port 19. When the valve 18 is actuated to its second position, fluid can flow from the port 19 through the valve 18 into a return line 20 which is connected to the reservoir 15.

The line 17 is also connected through a valve 21 to a mix chamber cylinder port 22 formed in an upper wall of the mixing block 14. The valve 21 is also connected to the return line 20 in a manner similar to the valve 18. The line 17 is also connected to supply pressured fluid through a valve 23 to a ball valve cylinder port 24 formed in an upper surface of the valve block 13. The valve 23 is also connected to the return line 20. The line 17 is further connected through a valve 25 to a second ball valve cylinder port 26. The valve 25 is also connected to the return line 20. The output line 17 is further connected through a valve 27 to a second mix chamber cylinder port 28 formed in the end of the mixing block 14 opposite the connection to the main body 12. Finally, the output line 17 is connected through a valve 29 to a second discharge duct cylinder port 30 formed in the upper end of the main body 12. A discharge duct nozzle 31 is formed on a cap block 32 attached to the lower end of the main body 12. The mixing block 14 is attached to an angled portion of the cap block 32 and the valve block 13 is attached to an opposite side of the cap block 32.

A first liquid component "A" is stored in a reservoir 33. The reservoir 33 is connected through a pump 34 to a feed port 35 formed in a side wall of the valve block 13. Similarly, a "B" liquid component is stored in a reservoir 36 which is connected through a pump 37 to a feed port (not shown) similar to the feed port 35 and formed in an opposite side of the valve block 13.

Figure 2:
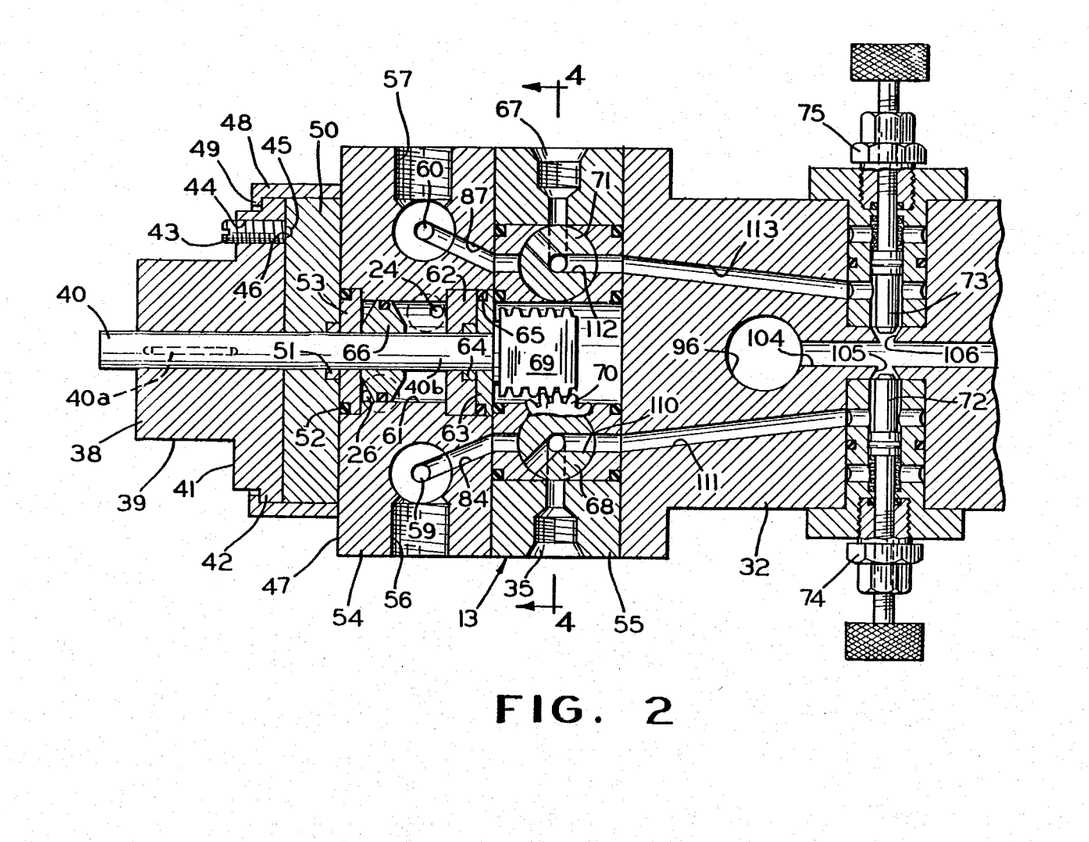
FIG. 2 is an enlarged fragmentary plan view taken in partial cross-section of the dispensing device of FIG. 1 in a dispensing mode.

Referring to FIG. 2, there is shown a fragmentary plan view of the apparatus 11 in partial cross-section. An indexing knob 38 has a smaller diameter end 39 formed with an annular knurled surface. The indexing knob 38 is retained on a ball valve piston shaft 40 which extends into the valve block 13. The knob is retained by any suitable means such as a key 40a. The knob 38 also has an intermediate diameter step portion 41 formed between the smaller diameter end 39 and a larger diameter end 42. A spring biased detent button 43 is retained in an aperture 44 formed in the step 41 and the larger diameter end 42. An end 45 of the button 43 is rounded and extends into a recess 46 formed in a surface facing the opening of the aperture 44. The button 43 and the recess 46 cooperate to retain the knob 38 in a predetermined angular position on a facing surface 47 of the valve block 13. The knob 38 is prevented from slipping off the shaft 40 by a collar 48 which has an inwardly extending flange 49 which engages the periphery of the larger diameter end 42. The collar 48 is retained on a cylindrical bearing retainer 50 which is attached to the facing surface 47. The collar 48 can be retained on the bearing retainer 50 by any suitable means such as threads.

The smaller diameter end 39 of the indexing knob 38 can be grasped by a human hand and rotated with the shaft 40 whereupon the end 45 of the button 43 is forced against the biasing spring and out of the recess 46. Although not shown, two additional recesses are formed in the bearing retainer 50 to provide three predetermined positions for the indexing knob 38 as described below.

The piston shaft 40 extends through a bearing 51 mounted in the bearing retainer 50 adjacent the facing surface 47 of the valve block 13. An O-ring 52 and a seal retainer 53 are mounted in a recess in the facing surface 47. The piston shaft 40 extends through a central aperture formed in the seal retainer 53 and the O-ring 52 seals against the bearing retainer 50.

The valve block 13 is formed of a recycle valve block 54 and a ball valve block 55 Formed in opposite sides of the recycle valve block 54 are a pair of recycle ports 56 and 57. As shown in FIG. 1, the recycle port 56 is connected by a line 58 to recycle the "A" component to the reservoir 33. Although not shown, the recycle port 57 is connected in a similar manner to recycle the "B" component to the reservoir 36. The recycle port 56 has a longitudinal axis formed in a generally horizontal plane and intersects a generally vertically extending recycle orifice 59. In a similar manner, the recycle port 57 intersects a generally vertically extending recycle orifice 60.

A cylinder 61 is formed through the center of the recycle valve block 54. One end of the cylinder 61 is closed by the seal retainer 53. The opposite end of the cylinder 61 is closed by a bearing retainer 62 and a seal retainer 63. An extension shaft 40b is attached to an end of the piston shaft 40 and extends through central apertures in the bearing retainer 62 and the seal retainer 63, and is supported by a bearing 64 mounted in the bearing retainer 62. The seal retainer 63 mounts an O-ring 65 against the bearing retainer 62 to seal the end of the cylinder 61. A piston 66 is located in the cylinder 61 and is attached to the piston shaft 40 at the junction with the extension shaft 40b. The ball valve cylinder port 24 is in fluid communication with the cylinder 61 adjacent the bearing retainer 62 and the second ball valve cylinder port 26 is in fluid communication with the cylinder 61 on the opposite side of the piston 66 adjacent the seal retainer 53.

As stated above, the liquid component "A" enters the valve block 13 through the feed port 35 formed in the valve block 55. On the opposite side of the valve block 55 there is formed a feed port 67 for receiving the component "B". The ball valve block 55 retains a ball valve 68 which is controlled by a ball valve rack 69 mounted on an end of the extension shaft 40b. The ball valve rack 69 engages a ball valve gear 70 which is coupled to the ball valve 68 as will be described below. In a similar manner, the ball valve rack 69 actuates a ball valve 71 which is in fluid communication with the feed port 67.

Mounted in the cap block 32 are a pair of spring biased dispense port valves 72 and 73. Associated with the valve 72 is a dispense port valve stop 74. Associated with the dispense port valve 73 is a dispense port valve stop 75. The operation of the valves 72 and 73 and the valve stops 74 and 75 will be described below.

Figure 3:
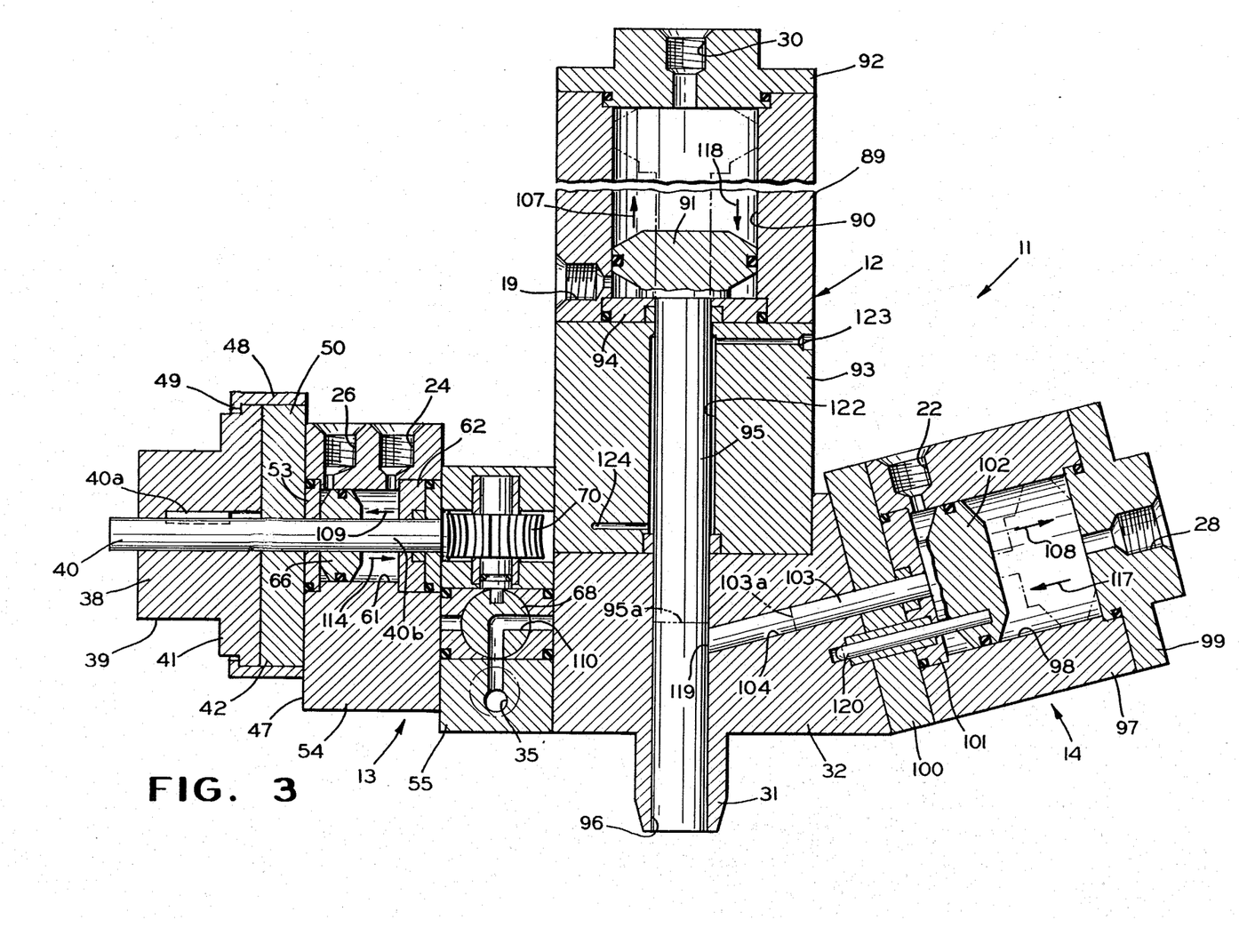
FIG. 3 is an enlarged fragmentary side elevation view in partial cross-section of the dispensing device of FIG. 1.
Figure 4:
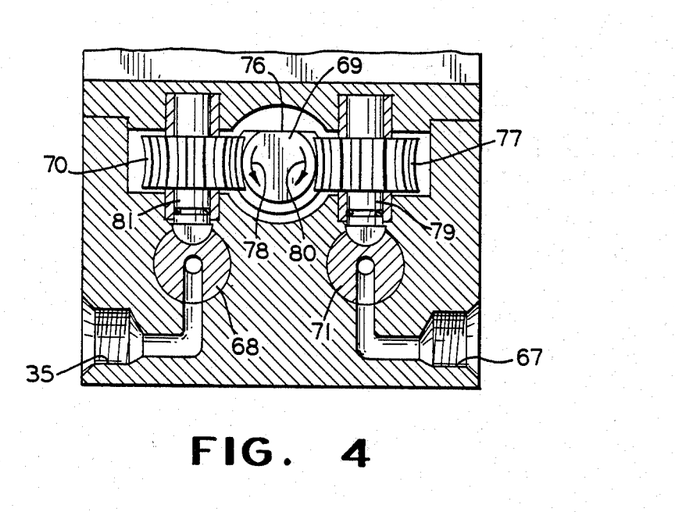
FIG. 4 is an enlarged fragmentary end elevation view in partial cross-section of the dispensing device of FIG. 1.

As best shown in FIGS. 3 and 4, the ball valve rack 69 is generally cylindrical in shape with a flat 76 formed thereon. In the central position shown in FIG. 4, the rack 69 engages the ball valve gear 70 associated with the ball valve 68 and a ball valve gear 77 associated with the ball valve 71 and the flat 76 is positioned midway between the gears. The ball valve rack 69 can be rotated about its longitudinal axis in the direction of an arrow 78 to place the flat 76 adjacent the gear 70. Thus, as the piston 66 and the piston shaft 40 are actuated to move in the cylinder 61, only the ball valve gear 77 will be rotated with an associated generally vertically extending shaft 79 to actuate the associated ball valve 71. Similarly, if the ball valve rack 69 is rotated in the direction of an arrow 80 until the flat 76 is adjacent the ball valve gear 77, only the ball valve gear 70 will be actuated to rotate an associated shaft 81 thereby actuating the associated bal valve 68. Two recesses can be formed in the bearing retainer 50 shown in FIG. 2 to provide means to cooperate with the detent button to retain the ball valve rack 69 in the two positions descibed.

Figure 5:
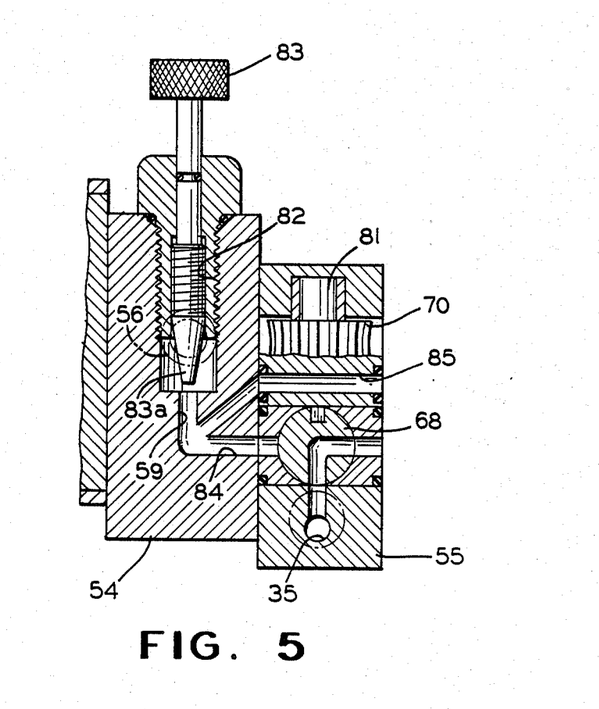
FIG. 5 is an enlarged fragmentary side elevation view in partial cross-section of the dispensing device of FIG. 1.

There is shown in FIG. 5 a fragmentary cross-sectional view of the recycle port and ball valve areas of the present invention. A longitudinal axis of the recycle port 56 insects a generally vertically extending threaded aperture 82 formed in an upper surface of the recycle valve block 54. Threadably engaged in the threaded aperture 82 is an adjustable recycle orifice needle 83. A tapered point 83a of the needle 83 is adjacent a bottom wall of the threaded aperture which bottom wall is in fluid communication with an end of the recycle orifice 59. The opposite end of the recycle orifice 59 branches into a recycle return duct 84 and a recycle pressure duct 85. The recycle return duct 84 extends into the ball valve block 55 and terminates adjacent the ball valve 68. The recycle pressure duct 85 extends through the ball valve block 55 and into the cap block 32 as will be described in conjunction with FIG. 6. A similar adjustable recycle orifice needle 86, shown in FIG. 1, is provided for the "B" component. The recycle orifice 60 branches into a recycle return duct 87 as shown in FIG. 2 and a recycle pressure duct 88 as shown in FIG. 6.

As best shown in FIG. 3, the main body 12 includes a cylinder block 89 having a cylinder 90 formed therein in which travels a discharge duct cylinder piston 91. An upper end of the cylinder block 89 is closed by an end plate 92 in which the second discharge duct cylinder port 30 is formed. The opposite end of the cylinder block 89 is attached to a plasticizer reservoir block 93. Adjacent the block 93, the end of the cylinder 90 is closed by a combination bearing and seal retainer 94. The block 93 is attached to an upper surface of the cap block 32. The discharge duct cylinder piston 91 is attached to an upper end of a discharge duct cylinder purge pin 95. The purge pin 95 extends through the bearing and seal retainer 94 and through the block 93 into an upper end of a discharge duct 96 formed through the cap block 32 and through the discharge duct nozzle 31.

The mixing block 14 is formed of a cylinder block 97 having a cylinder 98 formed therein. One end of the cylinder 98 is closed by an end plate 99 having the second mixing chamber cylinder port 28 formed therein. The opposite end of the cylinder block 97 is closed by an end block 100 which is attached to the cap block 32 at a surface which is angled with respect to the longitudinal axis of the main body 12 such that the longitudinal axis of the mixing block 14 extends outwardly and upwardly from the discharge duct nozzle 31. The end block 100 abuts a bearing and seal retainer 101 which closes the end of the cylinder 98 opposite the end plate 99. Located inside the cylinder 98 is a mix chamber piston 102 which is attached to one end of a mix chamber purge pin 103. In the position shown in FIG. 3, the purge pin 103 extends through the bearing and seal retainer 101, through the end block 100, and through a mix chamber 104 which intersects the discharge duct 96 at one end and intersects a pair of dispense ports 105 and 106 as best shown in FIG. 2. The dispense ports 105 and 106 are formed on opposite sides of the mix chamber 104 and are normally closed by the spring biased port valves 72 and 73 respectively.

Figure 6:
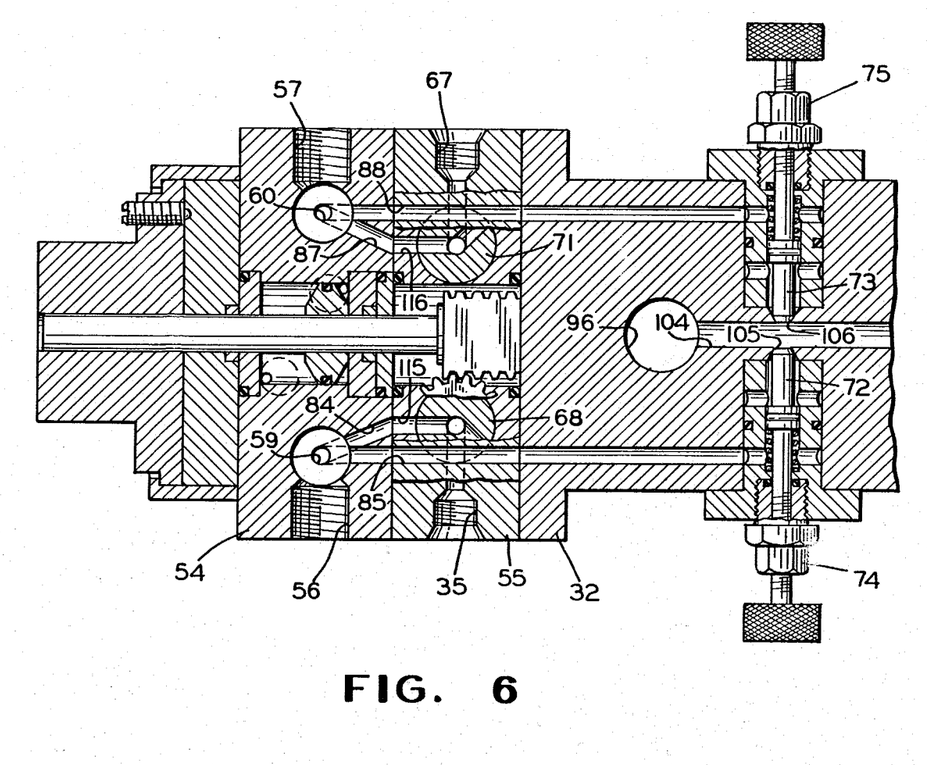
FIG. 6 is a view similar to FIG. 2 showing the dispensing device of FIG. 1 in a recycle mode.

FIG. 6 is a cross-sectional view similar to FIG. 2, but showing the present invention in the recycle mode. Referrings to FIGS. 1 through 5, the operation of the present invention will be described in the dispense mode. The valve 18 is actuated to apply pressured fluid to the discharge duct cylinder port 19. The port 19 is in fluid communication with the cylinder 90 on the bottom side of the discharge duct cylinder piston 91. The valve 29 connected to the second discharge duct cylinder port 30 is in the return mode to permit fluid flow from the duct 30 to the source of hydraulic fluid 15. Thus, the piston 91 will move in the direction of an arrow 107 to the top of the cylinder 90 raising the lower end of the purge pin 95 to the position shown in dashed line 95a in FIG. 3 just above the intersection of the mix chamber 104 with the discharge duct 96. Next, the valve 21 is actuated to apply pressured fluid to the mix chamber cylinder port 22. The cylinder port 22 is in fluid communication with the cylinder 98 on the side of the piston 102 adjacent the bearing and seal retainer 101. Thus, the piston 102 moves in the direction of an arrow 108 to a position adjacent the end plate 99 thereby moving the purge pin 103 such that an end of the purge pin 103 is in the position shown in dashed line 103a in FIG. 3 thereby unblocking the dispense ports 105 and 106.

The valve 23 is then actuated to apply pressured fluid to the ball valve cylinder port 24 which is in fluid communication with the cylinder 61. The fluid drives the piston 66 to the position shown in solid line in FIG. 3 adjacent the seal retainer 53. The movement of the piston 66 and the piston shaft 40 in the direction of an arrow 109 causes the ball valve rack 69 to move thereby rotating the gears 70 and 77. The gears 70 and 77 drive the ball valves 68 and 71 respectively through the shafts 81 and 79 respectively to the position shown in FIG. 2 and FIG. 4.

Fluid component "A" enters the port 35 and flows through a duct 110 formed in the ball valve 68 to a dispense duct 111 in fluid communication with the port valve 72. The component "A" fluid actuates the port valve 72 to open the valve against its preadjusted stop and allow the component "A" fluid to flow through the dispense port 105 into the mix chamber 104. Similarly, the component "B" fluid enters through the feed port 67 and flows through a duct 112 formed in the ball valve 71 to a dispense duct 113 which is in fluid communication with the port valve 73. The component "B" fluid actuates the dispense port valve 73 against its stop which permits the fluid to flow through the dispense port 106 and into the mix chamber 104. The liquid components, under high pressure, are blended completely upon entering the mix chamber 104 at ports 105 and 106. The blended liquid components travel at high velocity through the mix chamber 104 to its junction with the discharge duct 96. The components lose much of their velocity upon entering the much larger diameter discharge duct 96. The mixed components are then discharged from the mixing and dispensing apparatus 11 at the opening of the discharge duct 96 in the discharge duct nozzle 31.

When it is desired to stop dispensing the components, the valve 25 is actuated to apply pressured fluid to the second ball valve cylinder port 26. The port 26 is in fluid communication with the cylinder 61 on the side of the piston 66 adjacent to the retainer 53. The piston 66 is thus forced in the direction of an arrow 114 against the retainer 62. The movement of the piston also moves the ball valve rack 69 rotating the gears 70 and 77 thereby rotating the ball valves 68 and 71 respectively to the position shown in FIG. 6. The component "A" now flows through a branch 115 in the ball valve 68 which branch is connected with the recycle return duct 84. Not only will the component "A" flow into the recycle orifice 59 and through the recycle port 56, but it will also flow into the recycle pressure duct 85 which is in fluid communication with the dispense port valve 72 thereby forcing the port valve 72 to close the dispense port 105 and stop the flow of component "A" into the mix chamber 104.

Similarly, the feed port 67 is connected through the ball valve 71 by a branch 116 to the recycle return duct 87. Not only does the component "B" flow into the recycle orifice 60 and to the recycle port 57, but it also flows into the recycle pressure duct 88 to the dispense port valve 73 to actuate the valve to close the dispense port 106.

Next, the valve 27 is actuated to apply pressured fluid at the port 28 thereby moving the piston 102 and the purge pin 103 in the direction of an arrow 117. The purge pin 103 covers the dispense ports 105 and 106 and forces any mixture in the mix chamber 104 into the discharge duct 96. The valve 29 is then actuated to apply pressured fluid at the port 30 to move the piston 91 in the direction of an arrow 118. The movement of the piston 91 drives the purge pin 95 downwardly in the discharge duct 96 expelling all of the mixture out the open end of the discharge duct nozzle 31.

Certain manufacturing processees require a series of applications to be made within a few seconds of one another. In such an operation, the piston 91 and the purge pin 95 can remain in the up position while the other elements of the mixing and dispensing apparatus 11 are cycled as required. In the prior art dispensing equipment, the metering for obtaining the correct ratio of components was accomplished by utilizing a "metering head" connected near the meter pumps of the metering machine. It can be seen that the ratio of the components can be varied by the present invention by rotating the ball valve rack 69 among the three predetermined positions to obtain "A" component only, "B" component only or a mixture of the "A" and "B" components.

The valve stops 74 and 75 are manually adjustable to preset the pressure at which the dispense port valves 72 and 73 will open. The surface area against which the fluid components act through the dispense ducts 111 and 113 is greater than the surface area of the dispense port valves 72 and 73 exposed in the ports 105 and 106 respectively. Therefore, when one of the valves 72 and 73 is opened by its associated fluid component, the flow of the fluid component through the associated duct will not force open the other one of the dispense port valves thereby preventing chemical cross-over. The pressures involved can be in the range of 3,000 psi.

An end 119 of the purge pin 103 can be contoured to abut the facing surface of the purge pin 95 in the position shown in FIG. 3. In order to maintain the proper orientation, a guide pin 120 is affixed to the piston 102 and extends generally parallel to a longitudinal axis of the purge pin 103. A sleeve bearing 121 is mounted in an aperture formed through the end block 100, bearing and seal retainer 101 and the cap block 32 to slidably retain the guide pin 120 and prevent rotation of the piston 102 and the purge pin 103.

The mixed components are detrimental to the seals associated with the bearing and seal retainer 94. Therefore, the outer diameter of the purge pin 95 and the diameter of the discharge duct 96 are precisely machined for a close fit. As a further aid in preventing the components from reaching the pressure fluid in the cylinder 90, a reservoir 122 is formed about the purge pin 95 in a central area of the block 93 which reservoir is filled with a plasticizer material. An inlet port 123 and an outlet port 124 are formed at opposite ends of the reservoir and connected to a source of the plasticizer material (not shown) which typically is not under pressure.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for mixing and dispensing a plurality of reactive fluids comprising:
    a body;
    a mixing chamber formed in said body and having at least two inlet ports and an outlet port;
    a dispense duct formed in said body opening into each inlet port, each said dispense duct adapted to introduce a fluid component through said inlet ports into said mixing chamber from separate sources;
    first valve means in each said dispense duct for opening and closing said inlet ports;
    second valve means disposed upstream of said first valve means for controlling the flow of said fluid components from separate sources to said mixing chamber and including a pair of ball valves each associated with one of said dispense ducts;
    means for actuating said second valve means from a closed position and to an open position including a pair of ball valve gears each coupled to rotate an associated one of said ball valves, a ball valve rack engaging said gears, and means for moving said ball valve rack to rotate said gears and said ball valves; and
    means for selectively disabling said means for actuating including a flat formed on said ball valve rack and means for positioning said flat adjacent a selected one of said gears to prevent rotation of said selected gear as said ball valve rack is moved by said means for moving whereby a selected one of said fluid components is blocked from flowing to said mixing chamber by said second valve means.

2. The apparatus according to claim 1 including a purge pin positioned in said mixing chamber and means for actuating said purge pin between a first position blocking fluid flow from said inlet ports to said mixing chamber and a second position permitting fluid flow from said inlet ports to said mixing chamber.

3. The apparatus according to claim 2 wherein said means for actuating includes a piston coupled to said purge pin and positioned in a cylinder formed in said body with means for moving said piston between opposite ends of said cylinder.

4. The apparatus according to claim 2 wherein an end of said purge pin is contoured, and including means for preventing rotation of said purge pin about a longitudinal axis thereof.

5. The apparatus according to claim 4 wherein said means for preventing rotation includes a guide pin spaced from and extending generally parallel to a longitudinal axis of said purge pin, said guide pin coupled to said purge pin and slidably retained in an aperture formed in said body.

6. The apparatus according to claim 5 wherein said purge pin and said guide pin are attached to a piston included in said means for actuating said purge pin.

7. The apparatus according to claim 1 wherein said means for selectively disabling includes a shaft mounted in said body for sliding and rotational movement, said shaft being coupled to said ball valve rack at one end and having an opposite end coupled to means for maintaining said shaft in a selected one of a plurality of predetermined rotational positions.

8. The apparatus according to claim 7 wherein said means for maintaining includes a detent button retained by a knob coupled to said opposite end of said shaft and a plurality of recesses formed in a wall abutting said knob cooperating with said detent button to define a first one of said predetermined rotational positions wherein said ball valve rack rotates both of said gears, a second one of said predetermined rotational positions wherein said flat is adjacent one of said gears, and a third one of said predetermined rotational positions wherein said flat is adjacent the other one of said gears.

9. The apparatus according to claim 1 wherein said means for moving includes a piston coupled to said ball valve rack and positioned in a cylinder formed in said body.

10. An apparatus for mixing and dispensing a plurality of reactive fluids comprising:
a body;
a mixing chamber formed in said body and having at least two inlet ports and an outlet port;
a discharge duct formed in said body in fluid communication with said outlet port;
a purge pin positioned in said discharge duct;
means for actuating said purge pin between a first position wherein fluid flow from said mixing chamber to said discharge duct is blocked at said outlet port and a second position wherein fluid flow from said mixing chamber to said discharge duct is permitted through said outlet port;
a mixing chamber purge pin positioned in said mixing chamber;
means for actuating said mixing chamber purge pin between a first position blocking fluid flow from said inlet ports to said mixing chamber and a second position permitting fluid flow from said inlet ports to said mixing chamber;
a dispense duct formed in said body opening into each said inlet port, each said dispense duct adapted to introduce a fluid component through said inlet port into said mixing chamber from separate sources;
valve means for controlling the flow of said fluid components in said dispense ducts to said mixing chamber;
means for actuating said valve means between a first position blocking fluid flow from the separate sources to said mixing chamber and a second position permitting fluid flow from said fluid sources to said mixing chamber; and
means for selectively disabling said means for actuating said valves whereby a selected one of said valve means remains in said first position.

11. The apparatus according to claim 10 wherein said valve means includes a separate ball valve connected to each said dispense duct.

12. The apparatus according to claim 11 wherein said means for actuating said valve means includes a pair of gears each coupled to an associated one of said ball valves, a ball valve rack for engaging and rotating said gears, and means for moving said ball valve rack to rotate said gears.

13. The apparatus according to claim 12 wherein said means for moving includes a shaft coupled to said ball valve rack and to a piston movable in a cylinder formed in said body.

14. The apparatus according to claim 12 wherein said means for selectively disabling includes a flat formed on said ball valve rack and means for positioning said flat adjacent one of said gears to prevent movement of said associated ball valve to said second position.

15. The apparatus according to claim 10 including a reservoir containing a plasticizer material formed in said body about a portion of said purge pin positioned in said discharge duct.

16. An apparatus for mixing and dispensing two reactive fluids from separate sources, comprising:
a body;
a mixing chamber formed in said body having two inlet ports and an outlet port;
a pair of dispense ducts formed in said body each connected between an associated one of said inlet ports and a feed port for an associated one of two reactive fluids;
a pair of ball valves, each connected to an associated one of said dispense ducts;
means for actuating said ball valves between a first position blocking fluid flow in said dispense ducts and a second position permitting fluid flow in said dispense ducts, said means for actuating including a ball valve rack engaging a pair of gears, each said gear coupled to one of said ball valves, and means for moving said ball valve rack; and
means for selectively disabling said means for actuating including a flat formed on said ball valve rack and means for rotating said ball valve rack to selectively position said flat adjacent a selected one of said gears whereby a selected one of said ball valves remains in said first position while the other one of said ball valves is actuated to said second position.

17. The apparatus according to claim 16 wherein said gears are each attached to a shaft coupled to one of said ball valves, said ball valve rack engaging said gears and mounted on a piston shaft, and including a piston attached to said shaft and positioned for movement in a cylinder formed in said body, and means for moving said piston to rotate said gears and actuate said ball valves.

18. The apparatus according to claim 16 wherein said means for rotating includes means for inhibiting rotation of said ball valve rack when said flat is adjacent either of said gears and when said flat is midway between said gears.

* * * * *